(12) United States Patent
Araki

(10) Patent No.: US 7,399,842 B2
(45) Date of Patent: Jul. 15, 2008

(54) AZO COMPOUND

(75) Inventor: Katsumi Araki, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 10/593,284

(22) PCT Filed: Oct. 28, 2004

(86) PCT No.: PCT/JP2004/016014

§ 371 (c)(1),
(2), (4) Date: May 10, 2007

(87) PCT Pub. No.: WO2005/090483

PCT Pub. Date: Sep. 29, 2005

(65) Prior Publication Data

US 2007/0213515 A1  Sep. 13, 2007

(30) Foreign Application Priority Data

Mar. 17, 2004  (JP) .............................. 2004-076924

(51) Int. Cl.
*C09B 29/36* (2006.01)

(52) U.S. Cl. .................................................... 534/793

(58) Field of Classification Search .................. None
See application file for complete search history.

(56) References Cited

U.S. PATENT DOCUMENTS

| 2,228,303 | A * | 1/1941 | Fischer ....................... 534/774 |
| 3,012,843 | A * | 12/1961 | Le Blanc et al. ............... 8/692 |
| 3,600,377 | A * | 8/1971 | Stingl ......................... 534/876 |
| 7,193,068 | B2 * | 3/2007 | Araki et al. ................... 534/772 |
| 7,276,548 | B2 * | 10/2007 | Araki ......................... 524/106 |
| 2008/0014536 | A1 * | 1/2008 | Araki ......................... 430/328 |

FOREIGN PATENT DOCUMENTS

| DE | 27 14 204 A1 | 10/1977 |
| FR | 2 303 839 A1 | 8/1976 |
| JP | 138336 C2 | 9/1940 |
| JP | 36-12141 B | 7/1961 |
| JP | 41-19195 B | 11/1966 |
| JP | 101484 P | 12/1978 |
| JP | 58-152240 A | 9/1983 |
| JP | 2002-278056 | * 9/2002 |

* cited by examiner

*Primary Examiner*—Fiona T Powers
(74) *Attorney, Agent, or Firm*—Sughrue Mion, PLLC

(57) ABSTRACT

The present invention provides an azo compound represented by the following Formula (I). In Formula (I), $R^1$ and $R^2$ respectively independently represent a hydrogen atom, an alkyl group having 1 to 21 carbon atoms, an alkenyl group having 2 to 21 carbon atoms, an aryl group having 6 to 21 carbon atoms or an aralkyl group having 7 to 21 carbon atoms, were $R^1$ and $R^2$ may form a hetero ring in combination with a nitrogen atom combined therewith. $R^3$ represents a halogen atom, a trihalomethyl group, an alkoxy group having 1 to 21 carbon atoms, a nitro group or an amino group. $R^4$ represents a halogen atom or a —$SO_3M$ group, where M represents a cation of a metal atom or a cation made of a nitrogen-containing compound. m denotes an integer from 0 to 5. n denotes an integer from 0 to 4

Formula (I)

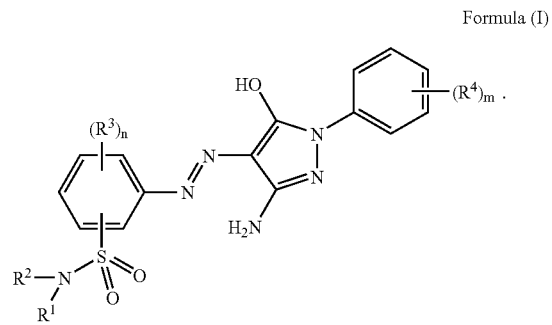

11 Claims, No Drawings

AZO COMPOUND

TECHNICAL FIELD

The present invention relates to a novel azo dye compound.

BACKGROUND ART

In the fields of dyes, development of compounds having high fastness, in both light resistance and heat resistance, has been desired and earnest investigations have been carried out. Particularly, in the fields of dyes soluble in solvents and water, development of compounds having both light resistance and heat resistance has been desired.

As dyes superior in both light resistance and heat resistance, phthalocyanine compounds and Cr complexes of azo dyes are known. However, these phthalocyanine compounds are unsuitable for the absorption of visible light having wavelengths in the range from 400 to 500 nm and are therefore not useful for yellow or magenta dyes. Moreover, phthalocyanine compounds exhibit high light resistance due to their molecular association and therefore problems concerning storage stability occur, for example precipitation of the dyes from the dissolved state of these dyes in water or a solvent.

Also, it has been pointed out that because the Cr complexes of azo dyes contain Cr atoms, they are harmful to humans, organisms and the environment and improvement in this regard is highly desired. Also, azo dyes are useful dyes that have a high color value and can exhibit absorption at various wavelengths. However, non-metal complex dyes that satisfy both high light resistance and high heat resistance at the same time have not yet been found.

Among these azo dyes, compounds having a γ acid as a coupling component (for example, Acid Red 57) and compounds having pyrazolone (for example, Acid Yellow 29) have been known as azo dyes having relatively high light resistance. However, compounds that can satisfy heat resistance at the same time have not yet been found (see, for example, Patent documents 1 to 4).

Also, there is the problem that heat resistance and light resistance deterioration of these dyes becomes significant depending on the conditions of use. There is also the problem that one or both of the heat resistance and the light resistance deteriorate according to the kind of fiber to be dyed, or when they coexist with, for example, other dye compounds, photopolymerization initiators, polymerizable compounds and/or an oxidant/reducing agent, or when they are in an environment where ozone or singlet oxygen is generated.

Moreover, many dyes exhibiting high light resistance and heat resistance tend to be reduced in solubility in water or a solvent, giving rise to many problems in industrial utilization.

Patent document 1: Specification of P.L. Patent No. 101484
Patent document 2: Specification of D.T. Patent No. 2714204
Patent document 3: Specification of F.R. Patent No. 2303839
Patent document 4: Publication of Japanese Patent Laid-Open No. 58-152240

DISCLOSURE OF THE INVENTION

Problems to be Solved by the Invention

The present invention has been made in view of the above various problems and provides an azo compound which is superior in heat resistance and light resistance and also in solubility in water and/or an organic solvent.

Means to Solve the Problem

Accordingly, the invention provides an azo compound represented by the following Formula (I).

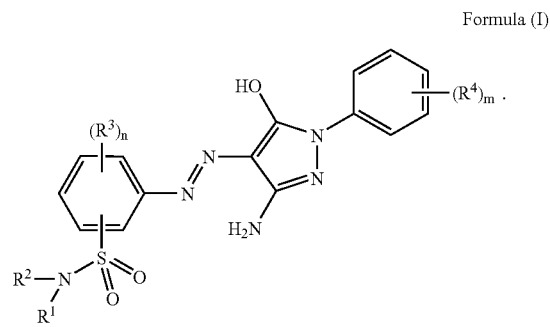

Formula (I)

In Formula (I), $R^1$ and $R^2$ respectively represent a hydrogen atom, an alkyl group having 1 to 21 carbon atoms, an alkenyl group having 2 to 21 carbon atoms, an aryl group having 6 to 21 carbon atoms or an aralkyl group having 7 to 21 carbon atoms, and $R^1$ and $R^2$ may form a hetero ring together with a nitrogen atom combined therewith. $R^3$ represents a halogen atom, a trihalomethyl group, an alkoxy group having 1 to 21 carbon atoms, a nitro group or an amino group. $R^4$ represents a halogen atom or a —$SO_3M$ group where M represents a cation of a metal atom or a cation comprising a nitrogen-containing compound. m denotes an integer from 0 to 5 and n denotes an integer from 0 to 4.

Effect of the Invention

The invention can provide an azo compound which is superior in heat resistance and light resistance and also in solubility in water and/or an organic solvent.

PREFERRED EMBODIMENTS OF THE INVENTION

The azo compound of the invention will be explained in detail.

The azo compound of the invention is a dye compound represented by the following Formula (I) and is a novel dye compound which satisfies both light resistance and heat resistance, which is not associated with conventionally-known azo compounds, and can be dissolved freely in water and/or an organic solvent as necessary.

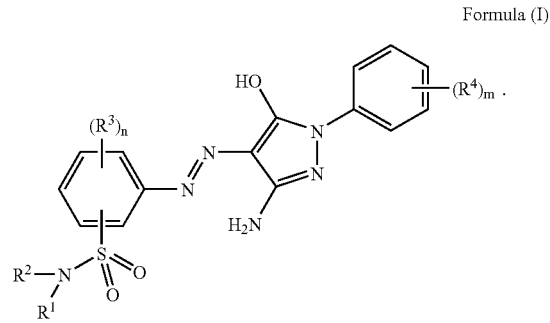

Formula (I)

In Formula (I), $R^1$ and $R^2$ respectively represents a hydrogen atom, an alkyl group having 1 to 21 carbon atoms, an alkenyl group having 2 to 21 carbon atoms, an aryl group having 6 to 21 carbon atoms or an aralkyl group having 7 to 21 carbon atoms.

The alkyl group represented by the $R^1$ or $R^2$ having 1 to 21 carbon atoms may be substituted or unsubstituted, and is preferably an alkyl group having 1 to 15 carbon atoms and more preferably an alkyl group having 1 to 10 carbon atoms.

The alkyl group represented by the $R^1$ or $R^2$ and having 1 to 21 carbon atoms may be any of straight-chain, branched or cyclic alkyl groups. Preferable examples of these alkyl groups include a methyl group, an ethyl group, a n-propyl group, a n-butyl group, a n-amyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, a n-eicosanyl group, an i-propyl group, a sec-butyl group, an i-butyl group, a t-butyl group, a 1-methylbutyl group, a 1-ethylpropyl group, a 2-methylbutyl group, an i-amyl group, a neopentyl group, a 1,2-dimethylpropyl group, a 1,1-dimethylpropyl group, a t-amyl group, a 1,3-dimethylbutyl group, a 3,3-dimethylbutyl group; 2-ethylbutyl group, a 2-ethyl-2-methylpropyl group, a straight-chain or branched heptyl group, a 1-methylheptyl group, a 2-ethylhexyl group, a 1,5-dimethylhexyl group, a t-octyl group, a branched nonyl group, a branched decyl group, a branched undecyl group, a branched dodecyl group, a branched tridecyl group, a branched tetradecyl group, a branched pentadecyl group, a branched hexadecyl group, a branched heptadecyl group, a branched octadecyl group, a straight-chain or branched nonadecyl group, a straight-chain or branched eicosanyl group, a cyclopropyl group, a cyclopropylmethyl group, a cyclobutyl group, a cyclobutylmethyl group, a cyclopentyl group, a cyclohexyl group, a cyclohexylmethyl group, a cycloheptyl group, a cyclooctyl group, a cyclohexylpropyl group, a cyclododecyl group, a norbornyl group, a bornyl group, a cis-myrtanyl group, an isopinocamphenyl group, a noradamantyl group, an adamantyl group, an adamantylmethyl group, a 1-(1-adamantyl)ethyl group, a 3,5-dimethyladamantyl group, a quinuclidinyl group, a cyclopentylethyl group and a bicyclooctyl group.

More preferable examples among the above include a methyl group, an ethyl group, a n-propyl group, a n-butyl group, a n-amyl group, a n-hexyl group, a n-heptyl group, a n-octyl group, a n-nonyl group, a n-decyl group, a n-undecyl group, a n-dodecyl group, a n-tridecyl group, a n-tetradecyl group, an i-propyl group, a sec-butyl group, an i-butyl group, a t-butyl group, a 1-methylbutyl group, a 1-ethylpropyl group, a 2-methylbutyl group, an i-amyl group, a neopentyl group, a 1,2-dimethylpropyl group, a 1,1-dimethylpropyl group, a t-amyl group, a 1,3-dimethylbutyl group, a 3,3-dimethylbutyl group, a 2-ethylbutyl group, a 2-ethyl-2-methylpropyl group, a straight-chain or branched heptyl group, a 1-methylheptyl group, a 2-ethylhexyl group, a 1,5-dimethylhexyl group, a t-octyl group, a branched nonyl group, a branched decyl group, a branched undecyl group, a branched dodecyl group, a branched tridecyl group, a branched tetradecyl group, a cyclopropyl group, a cyclopropylmethyl group, a cyclobutyl group, a cyclobutylmethyl group, a cyclopentyl group, a cyclohexyl group, a cyclohexylmethyl group, a cycloheptyl group, a cyclooctyl group, a cyclohexylpropyl group, a cyclododecyl group, a norbornyl group, a bornyl group, a cis-myrtanyl group, an isopinocamphenyl group, a noradamantyl group, an adamantyl group, an adamantylmethyl group, a 1-(1-adamantyl)ethyl group, a 3,5-dimethyladamantyl group, a quinuclidinyl group, a cyclopentylethyl group and a bicyclooctyl group.

Further, particularly preferable examples among the above include a methyl group, an ethyl group, a n-propyl group, a n-butyl group, a n-amyl group, a n-hexyl group, a n-heptyl group, a n-octyl group, a n-nonyl group, a n-decyl group, an i-propyl group, a sec-butyl group, an i-butyl group, a t-butyl group, a 1-methylbutyl group, a 1-ethylpropyl group, a 2-methylbutyl group, an i-amyl group, a neopentyl group, a 1,2-dimethylpropyl group, a 1,1-dimethylpropyl group, a t-amyl group, a 1,3-dimethylbutyl group, a 3,3-dimethylbutyl group, a 2-ethylbutyl group, a 2-ethyl-2-methylpropyl group, a straight-chain or branched heptyl group, a 1-methylheptyl group, a 2-ethylhexyl group, a 1,5-dimethylhexyl group, a t-octyl group, a branched nonyl group, a branched decyl group, a cyclopropyl group, a cyclopropylmethyl group, a cyclobutyl group, a cyclobutylmethyl group, a cyclopentyl group, a cyclohexyl group, a cyclohexylmethyl group, a cycloheptyl group, a cyclooctyl group, a cyclohexylpropyl group, a cyclododecyl group, a norbornyl group, a bornyl group, a noradamantyl group, an adamantyl group, an adamantylmethyl group, a 1-(1-adamantyl)ethyl group, a 3,5-dimethyladamantyl group, a cyclopentylethyl group and a bicyclooctyl group.

Among the above groups, an ethyl group, a n-propyl group, a n-butyl group, a n-amyl group, a n-hexyl group, a n-heptyl group, a n-octyl group, a n-nonyl group, a n-decyl group, branched alkyl groups or cyclic alkyl groups such as an i-propyl group, a sec-butyl group, an i-butyl group, a t-butyl group, a 1-methylbutyl group, a 1-ethylpropyl group, a 2-methylbutyl group, an i-amyl group, a neopentyl group, a 1,2-dimethylpropyl group, a 1,1-dimethylpropyl group, a t-amyl group, a 1,3-dimethylbutyl group, a 3,3-dimethylbutyl group, a 2-ethylbutyl group, a 2-ethyl-2-methylpropyl group, a branched heptyl group, a 1-methylheptyl group, a 1,5-dimethylhexyl group, a t-octyl group, a branched nonyl group, a branched decyl group, a cyclopropyl group, a cyclopropylmethyl group, a cyclobutyl group, a cyclobutylmethyl group, a cyclopentyl group, a cyclohexyl group, a cyclohexylmethyl group, a cycloheptyl group, a cyclooctyl group, a cyclohexylpropyl group, a cyclododecyl group, a norbornyl group, a bornyl group, a noradamantyl group, an adamantyl group, an adamantylmethyl group, a 1-(1-adamantyl)ethyl group, a 3,5-dimethyladamantyl group, a cyclopentylethyl group or a bicyclooctyl group are particularly preferable from the viewpoint of improving heat resistance.

In the alkyl groups exemplified above, particularly, an alkyl group having a fluorine substituent is preferable. Examples of the alkyl group having a fluorine substituent include a trifluoromethyl group, a trifluoroethyl group, a pentafluoroethyl group, a heptafluoropropyl group, a nonafluorobutyl group, a tridecafluorohexyl group, a pentadecafluoroheptyl group, a heptadecafluorooctyl group, a tridecafluorooctyl group, a nonadecafluorononyl group, a heptadecafluorodecyl group and a perfluorodecyl group. More preferable examples among these include a trifluoromethyl group, a pentafluoroethyl group, a heptafluoropropyl group, a nonafluorobutyl group, a tridecafluorohexyl group and a pentadecafluoroheptyl group, and particularly preferable examples among these include a trifluoromethyl group, a pentafluoroethyl group, a heptafluoropropyl group, a nonafluorobutyl group and a tridecafluorohexyl group.

The alkenyl group represented by the $R^1$ or $R^2$ and having 2 to 21 carbon atoms may be substituted or unsubstituted, and is preferably an alkenyl group having 2 to 15 carbon atoms and more preferably an alkenyl group having 2 to 10 carbon atoms.

Preferable examples of the alkenyl group represented by the $R^1$ or $R^2$ and having 2 to 21 carbon atoms include a vinyl group, an isopropenyl group, a 2-propenyl group, a 2-methylpropenyl group, a 1-methyl-1-propenyl group, a 1-butenyl group, a 3-butenyl group, a 1-methyl-1-butenyl group, a 1,1-dimethyl-3-butenyl group, a 1-pentenyl group, a 2-pentenyl group, a 1-ethyl-1-pentenyl group, a 1-hexenyl group, a 1-heptenyl group, a 2,6-dimethyl-5-heptenyl group, a 9-decenyl group, a 1-cyclopentenyl group, a 2-cyclopentenylmethyl group, a cyclohexenyl group, a 1-methyl-2-cyclohexenyl group, a 1,4-dihydro-2-methylphenyl group, an octenyl group, a citronellyl group, an oleyl group, a geranyl group, a farnesyl group and a 2-(1-cyclohexenyl)ethyl group.

More preferable examples among these include a vinyl group, an isopropenyl group, 2-propenyl group, a 2-methylpropenyl group, a 1-methyl-1-propenyl group, a 1-butenyl group, a 3-butenyl group, a 1-methyl-1-butenyl group, a 1,1-dimethyl-3-butenyl group, a 1-pentenyl group, a 2-pentenyl group, a 1-ethyl-1-pentenyl group, a 1-hexenyl group, a 1-heptenyl group, a 1-cyclopentenyl group, a 2-cyclopentenylmethyl group, a cyclohexenyl group, a 1-methyl-2-cyclohexenyl group and a 1,4-dihydro-2-methylphenyl group. Further preferable examples among these include a vinyl group, an isopropenyl group, a 2-propenyl group, a 2-methyl-propenyl group, a 1-methyl-1-propenyl group, a 1-butenyl group, a 3-butenyl group, a 1-methyl-1-butenyl group, a 1,1-dimethyl-3-butenyl group, a 1-pentenyl group, a 2-pentenyl group, a 1-ethyl-1-pentenyl group, a 1-hexenyl group, a 1-cyclopentenyl group, a 2-cyclopentenylmethyl group, a cyclohexenyl group, a 1-methyl-2-cyclohexenyl group and a 1,4-dihydro-2-methylphenyl group.

The aryl group represented by the $R^1$ or $R^2$ and having 6 to 21 carbon atoms may be substituted or unsubstituted, and is preferably an aryl group having 6 to 15 carbon atoms and more preferably an aryl group having 6 to 10 carbon atoms.

Preferable examples of the aryl group represented by the $R^1$ or $R^2$ and having 6 to 21 carbon atoms include a phenyl group, a naphthyl group, a biphenylenyl group, an acenaphthenyl group, a fluorenyl group, an anthracenyl group, an anthraquinonyl group and a pyrenyl group. Particularly preferable examples among these groups include a phenyl group, a naphthyl group, a biphenylenyl group, an acenaphthenyl group, a fluorenyl group and an anthracenyl group. Further preferable examples among these groups include a phenyl group, a naphthyl group, a biphenylenyl group and a fluorenyl group.

The aralkyl group represented by the $R^1$ or $R^2$ and having 7 to 21 carbon atoms may be substituted or unsubstituted, and is preferably an aralkyl group having 7 to 15 carbon atoms and more preferably an aralkyl group having 7 to 10 carbon atoms.

Preferable examples of the aralkyl group represented by the above $R^1$ or $R^2$ and having 7 to 21 carbon atoms include a benzyl group, a diphenylmethyl group, a 1,2-diphenylethyl group, a phenyl-cyclopentylmethyl group, an α-methylbenzyl group, a phenylethyl group, an α-methyl-phenylethyl group, a β-methyl-phenylethyl group, a 3-phenylpropyl group, a 3,3-diphenylpropyl group, a 4-phenylbutyl group, a naphthylmethyl group, a styryl group, a cinnamyl group, a fluorenyl group, a 1-benzocyclobutenyl group, a 1,2,3,4-tetrahydronaphthyl group, an indanyl group, a piperonyl group and a pyrenemethyl group.

More preferable examples among these groups include a benzyl group, a phenyl-cyclopentylmethyl group, a α-methylbenzyl group, a phenylethyl group, a α-methyl-phenylethyl group, a β-methyl-phenylethyl group, a 3-phenylpropyl group, a 4-phenylbutyl group, a styryl group, a cinnamyl group, a fluorenyl group, a 1-benzocyclobutenyl group and a 1,2,3,4-tetrahydronaphthyl group. Further preferable examples among these groups include a benzyl group, a α-methylbenzyl group, a phenylethyl group, a α-methyl-phenylethyl group, a β-methyl-phenylethyl group, a 3-phenylpropyl group, a styryl group, a cinnamyl group, a fluorenyl group, a 1-benzocyclobutenyl group and a 1,2,3,4-tetrahydronaphthyl group.

The group represented by $R^1$ or $R^2$ may contain an ether group, and preferable examples thereof further include a tetrahydrofurfuryl group and a 2,5-dihydro-2,5-dimethoxyfurfuryl group.

The $R^1$ or $R^2$ may form a hetero ring together with a nitrogen atom combined therewith. Preferable examples of the hetero ring include a 2-methylaziridine ring, an azetidine ring, a pyrrolidine ring, a 3-pyrroline ring, a piperidine ring, a 1,2,3,6-tetrahydropyridine ring, a hexamethyleneimine ring, a piperazine ring, a 1,3,3-trimethyl-6-azabicyclo[3.2.1]octane ring, a decahydroquinoline ring, a oxazolidine ring, a morpholine ring, a thiazolidine ring, a thiomorpholine ring, an indoline ring, an isoindoline ring, a 1,2,3,4-tetrahydrocarbazole ring, a 1,2,3,4-tetrahydroquinoline ring, a 1,2,3,4-tetrahydroisoquinoline ring, an iminodibenzyl ring, a phenoxazine ring, a phenothiazine ring and a phenazine ring.

Among these groups, a pyrrolidine ring, a 3-pyrroline ring, a piperidine ring, a 1,2,3,6-tetrahydropyridine ring, a hexamethyleneimine ring, a piperazine ring, a decahydroquinoline ring, an oxazolidine ring, a morpholine ring, a thiazolidine ring and a thiomorpholine ring are more preferable, and particularly preferable examples among these group include a pyrrolidine ring, a 3-pyrroline ring, a piperidine ring, a 1,2,3,6-tetrahydropyridine ring, a piperazine ring, a decahydroquinoline ring, an oxazolidine ring, a morpholine ring, a thiazolidine ring and a thiomorpholine ring.

In the case where the group represented by the $R^1$ or $R^2$ or the hetero ring formed of the $R^1$, $R^2$ and the nitrogen atom has a substituent, preferable examples of the substituent include an acyl group, an acylamino group, an acylaminocarbonylamino group, an aralkylaminocarbonylamino group, an arylaminocarbonylamino group, a methacryloylaminocarbonylamino group, a trifluoromethyl group, a fluoro group, a chloro group, a bromo group, an iodo group, a hydroxy group, a nitro group, a methyl group, an ethyl group, a n-propyl group, an i-propyl group, a n-butyl group, an i-butyl group, a sec-butyl group, a t-butyl group, a pentyl group, a hexyl group, a heptyl group, an octyl group, a vinyl group, a methoxy group, an ethoxy group, a butoxy group, an isopropoxy group, a t-butoxy group, a cyclohexyloxy group, a vinyloxy group, a methylthio group, an ethylthio group, a pyrrolidinyl group, a piperidinyl group, an amino group, a dimethylamino group, a diethylamino group and phenyl group.

More preferable among these groups include an acyl group (especially, an acetyl group), acylamino group, a trifluoromethyl group, a fluoro group, a chloro group, a bromo group, a hydroxy group, a nitro group, a methyl group, an ethyl group, a n-propyl group, an i-propyl group, a n-butyl group, an i-butyl group, a sec-butyl group, a t-butyl group, a pentyl group, a hexyl group, a vinyl group, a methoxy group, an ethoxy group, a butoxy group, an isopropoxy group, a t-butoxy group, a cyclohexyloxy group, a vinyloxy group, a methylthio group, an ethylthio group, a pyrrolidinyl group, a piperidinyl group, an amino group, a dimethylamino group, a diethylamino group and a phenyl group.

Further preferable examples among these groups include an acyl group (especially, an acetyl group), acylamino group, a trifluoromethyl group, a fluoro group, a chloro group, a bromo group, a hydroxy group, a nitro group, a methyl group, an ethyl group, a n-propyl group, an i-propyl group, a n-butyl group, an i-butyl group, a t-butyl group, a hexyl group, a vinyl group, a methoxy group, an ethoxy group, an isopropoxy group, a cyclohexyloxy group, a vinyloxy group, a methylthio group, an ethylthio group, a pyrrolidinyl group, a piperidinyl group, an amino group, a dimethylamino group, a diethylamino group and a phenyl group.

These substituents may be further substituted with substituents which are the same as those exemplified above.

Also, when the substituent is a group having active hydrogen such as a hydroxy group and an amino group, the substituent may have a substituent such as an acetyl group, an acyl group, a (meth)acryloyl group, an alkylaminocarbonyl group, an arylaminocarbonyl group (for example, a butylaminocarbonyl group and a phenylaminocarbonyl group), alkyl group, or aralkyl group, by reacting various acid chlorides, acid anhydride, halides or various isocyanates therewith.

Alkyl groups, alkenyl groups, aryl groups and aralkyl groups represented by $R^1$ or $R^2$ and hetero rings formed of the $R^1$, $R^2$ and a nitrogen atom may be further substituted with substitutes the same as those exemplified for each of the groups above represented by $R^1$ or $R^2$.

From the perspective of color value, for the formula weight of the groups represented by $R^1$ or $R^2$, the sum of the formula weights of $R^1$ and $R^2$ is preferably 500 or less, more preferably 400 or less and particularly preferably 300 or less.

The number of the substituents is preferably 0 to 4, more preferably 0 to 3 and particularly preferably 0 to 2.

The above $R^3$ represents a halogen atom, a trihalomethyl group, an alkoxy group having 1 to 21 carbon atoms, a nitro group or an amino group which may be substituted or unsubstituted. Preferable examples of the group represented by $R^3$ include a fluorine atom, a chlorine atom, a bromine atom, a trifluoromethyl group, an alkoxy group having 1 to 15 carbon atoms, a nitro group and an amino group which may have a substituent. More preferable examples of the group represented by $R^3$ include a fluorine atom, a chlorine atom, a trifluoromethyl group, an alkoxy group having 1 to 10 carbon atoms, a nitro group and an amino group which may have a substituent. Particularly preferable examples of the group represented by $R^3$ include a chlorine atom, a trifluoromethyl group, an alkoxy group having 1 to 7 carbon atoms, a nitro group and an amino group which may have a substituent.

Preferable examples of the alkoxy group represented by $R^3$ include alkyloxy groups having, as the alkyl part thereof, an alkyl group given as preferable examples of the alkyl group represented by $R^1$ or $R^2$.

When the amino group represented by $R^3$ has a substituent, examples of the substituent include groups given as examples of the substituent of the group represented by $R^1$ or $R^2$ above.

n above denotes an integer from 0 to 4, wherein when n=0, $R^3$ has no substituent other than a —$SO_2NR^1R^2$ group. n is preferably an integer from 0 to 3, preferably an integer from 0 to 2, and particularly preferably an integer from 0 to 1.

$R^4$ above represents a halogen atom or a —$SO_3M$ group. Among these groups represented by $R^4$, a fluorine atom, a chlorine atom, a bromine atom and a —$SO_3M$ group are preferable, a fluorine atom, a chlorine atom and a —$SO_3M$ group are more preferable, and a chlorine atom and a —$SO_3M$ group are particularly preferable.

M above represents a cation of a metal atom or a cation comprising a nitrogen-containing compound. Among these cations represented by M, preferable cations are Li, Na, K, Rb, Cs, Ag, Mg, Ca, Sr, Ba, Zn, Al, Ni, Cu, Co or Fe or cation comprising a nitrogen-containing compound, cations of Na, K, Rb, Cs, Ag, Mg, Ca, Ba, Zn, Al, Cu or Fe or a cation comprising a nitrogen-containing compound are more preferable, and cations of Na, K, Mg, Ca, Ba, Zn, Al, Cu or Fe or a cation comprising a nitrogen-containing compound are particularly preferable.

m above denotes an integer from 0 to 5. When n=0, the phenyl group is unsubstituted. m is preferably an integer from 0 to 4 and more preferably an integer from 0 to 3.

As a cation comprising a nitrogen-containing compound represented by the M, an appropriate one is selected in consideration of all of factors such as solubility in an organic solvent or water, salt formability, absorbance and color value of a dye comprising thereof, and heat resistance and light resistance required for a colorant or the like. When selecting only from the viewpoint of absorbance and color value, the nitrogen-containing compound preferably has a molecular weight as small as possible. The molecular weight thereof is preferably 300 or less, more preferably 280 or less, and particularly preferably 250 or less.

Specific examples of the nitrogen-containing compound in the above description "a cation comprising a nitrogen-containing compound" will be given below.

However, these examples are not intended to limit the scope of the invention. The "cation" used herein indicates each of the following nitrogen-containing compound which is protonated to be in the state of a cation.

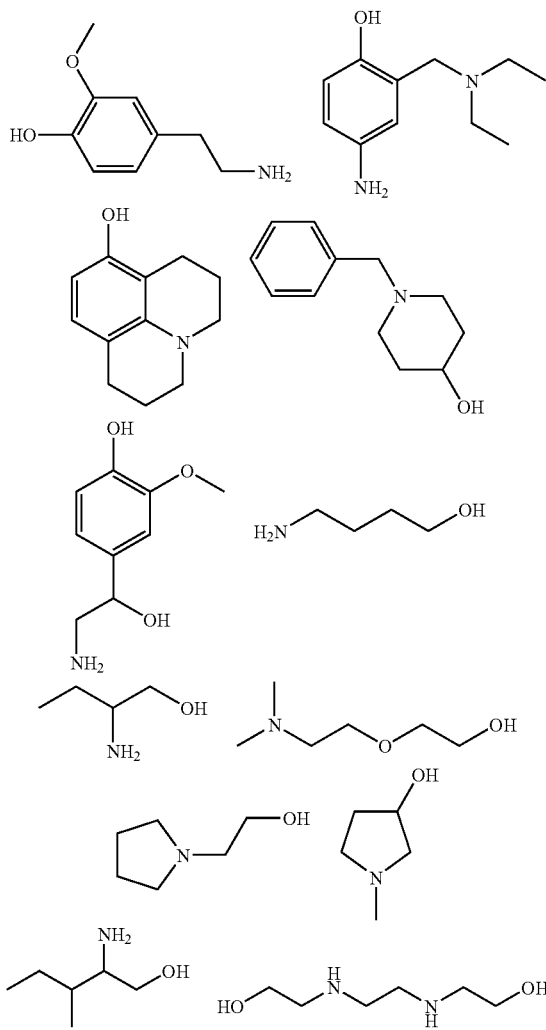

-continued
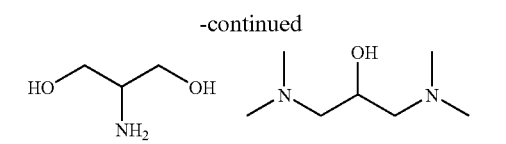
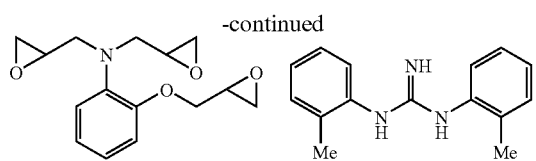
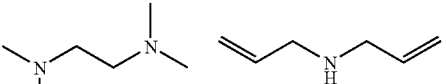
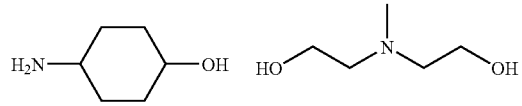
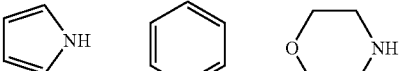
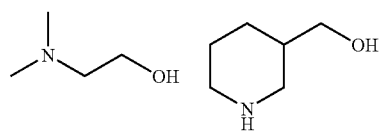
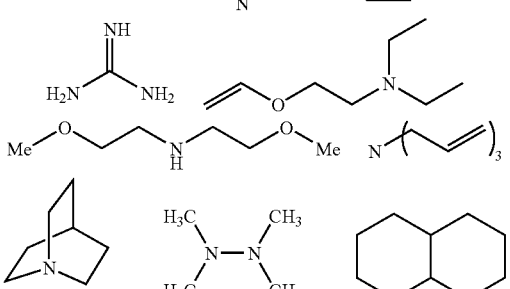
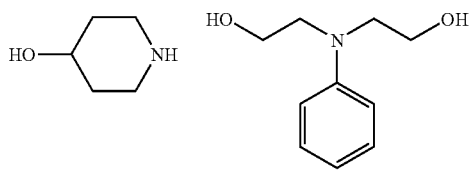
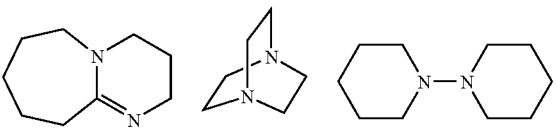
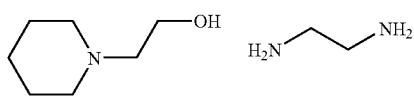
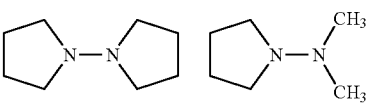
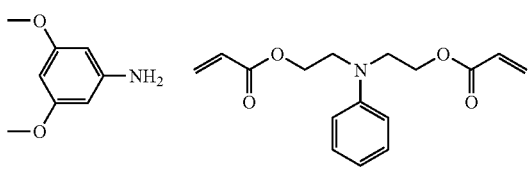
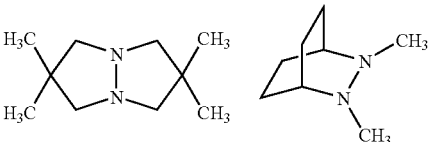
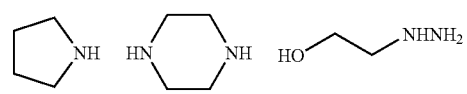
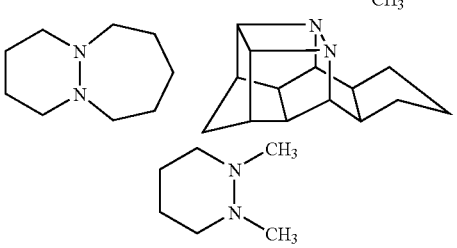
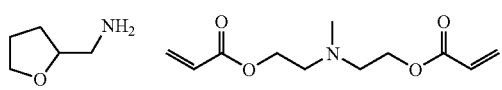
Among azo compounds represented by Formula (I), azo compounds having the structure represented by the following Formula (II), (III) or (IV) are preferable from the viewpoint of light resistance, heat resistance, solubility in water or an organic solvent, molar absorption coefficient and ease of synthesis.

Formula (II)

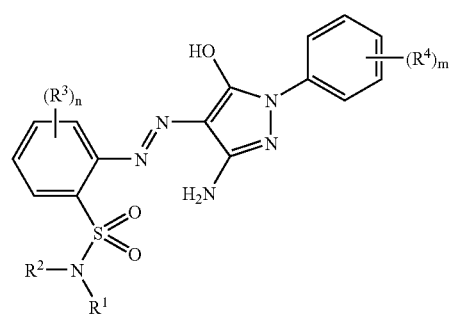

Formula (III)

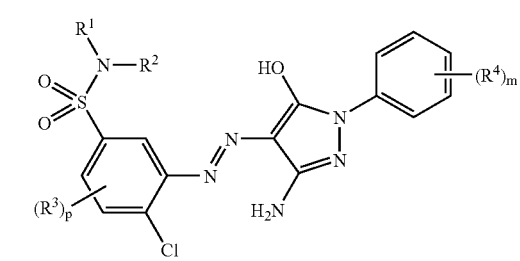

Formula (IV)

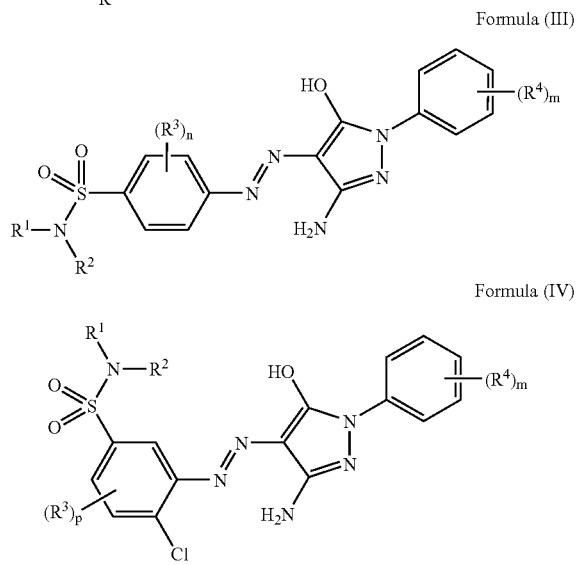

The scope of each of $R^1$, $R^2$, $R^3$, $R^4$ and m in Formulae (II), (III) and (IV) is the same as that of $R^1$, $R^2$, $R^3$, $R^4$ and m in Formula (I) and their preferable embodiments are also the same. Also, n in Formulae (II) and (III) has the same meaning as n in Formula (I) and the preferable ranges are also the same. p in Formula (IV) represents an integer of 0 to 3, more preferably 0 to 2 and particularly preferably an integer of 0 to 1.

Specific examples (exemplified compounds (1) to (20)) of the azo compound represented by Formula (I) will be given below. However, these examples are not intended to limit the invention.

(1)

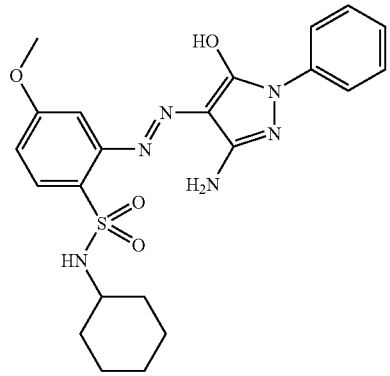

(2)

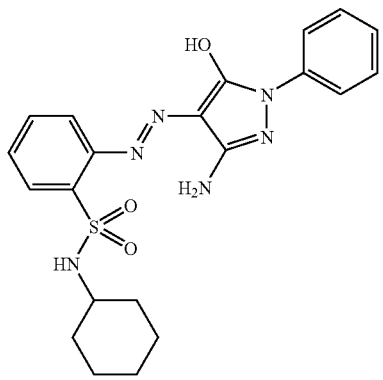

(3)

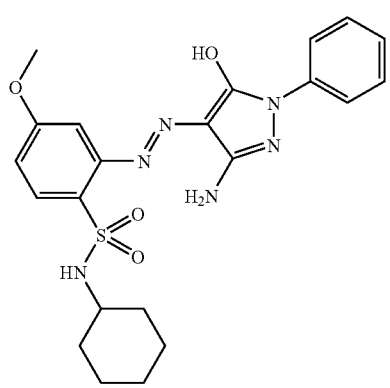

(4)

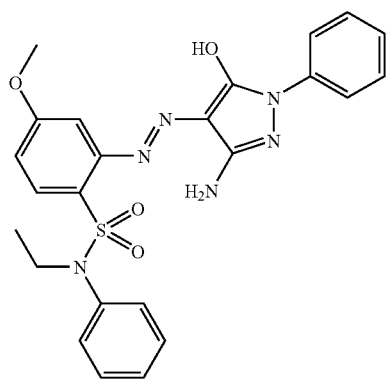

(5)

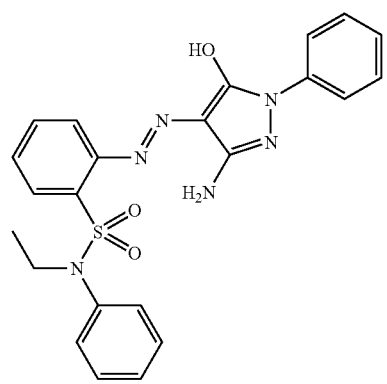

-continued
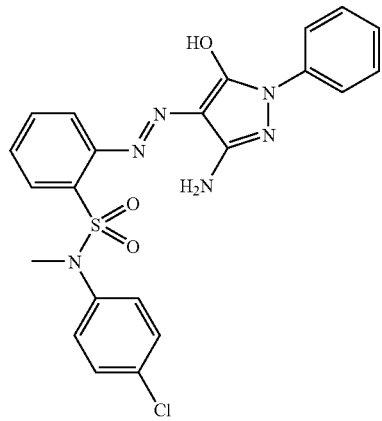
(6)
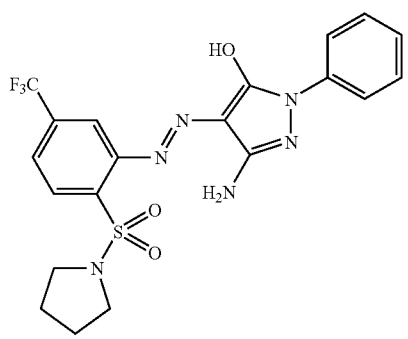
(7)
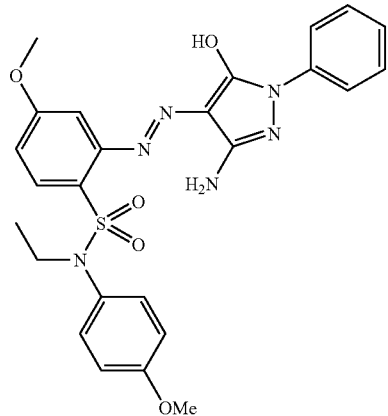
(8)
-continued
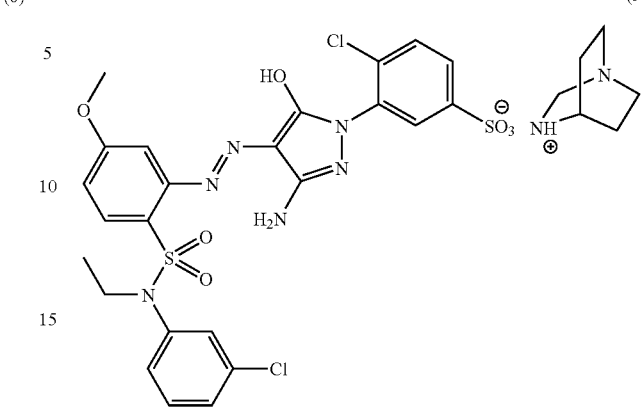
(9)
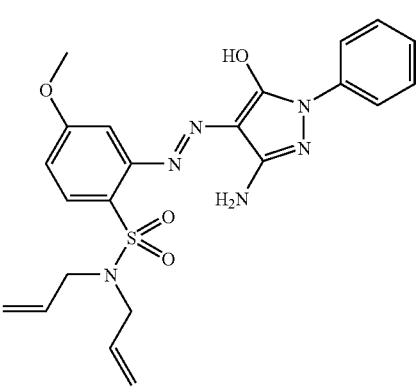
(10)
(11)

(12)
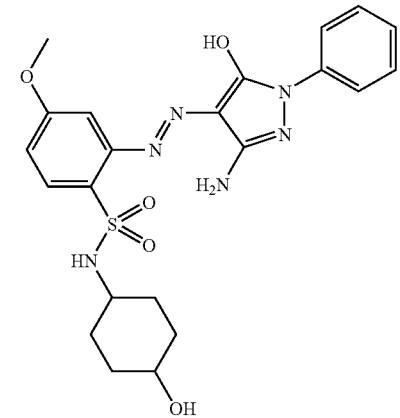
(13)
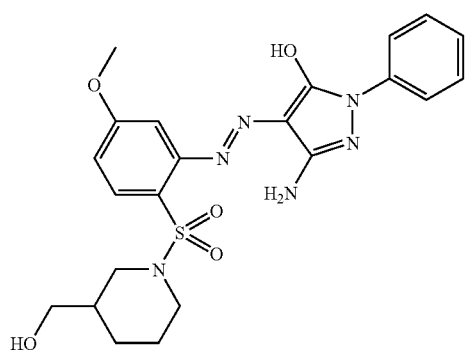
(14)
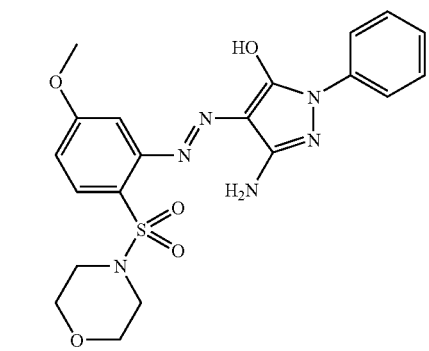
(15)
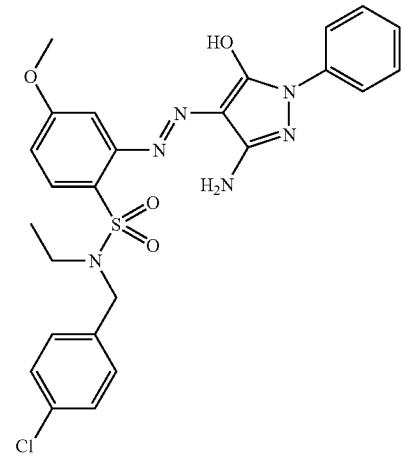
(16)
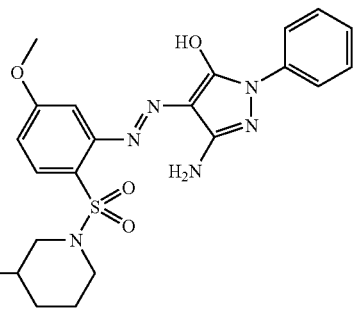
(17)
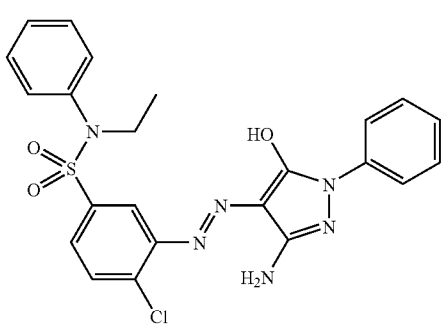
(18)
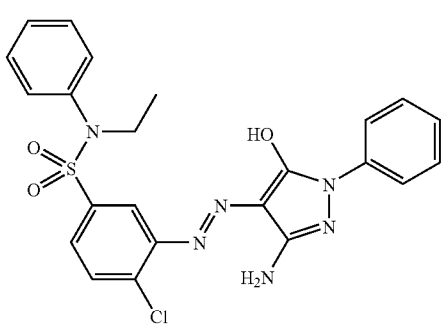
(19)
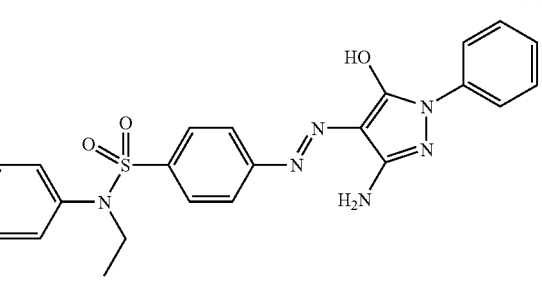

(20)

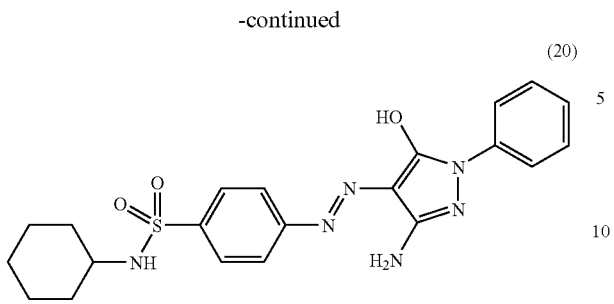

The azo compound represented by Formula (I) may be synthesized in general, for example, by using a method including reducing a nitrobenzene derivative substituted with a desired compound, diazotizing, and adding 3-amino-1-phenyl-2-pyrazolin-5-one thereto. Various compounds represented by Formula (I) may be synthesized in similar manners by suitable changing the desired compound, the substituent of 3-amino-1-phenyl-2-pyrazoline-5-one and the like.

The invention will be more concretely explained by way of examples. The invention is not limited to the following examples, and other modifications are possible as long as the subject thereof is within the scope of the invention.

EXAMPLE 1

Synthesis of Exemplified Compound (1)

The azo compound of the invention was synthesized according to the following scheme. The compounds (1) to (4) shown in each reaction stage correspond to the compounds (1) to (4) which are explained below.

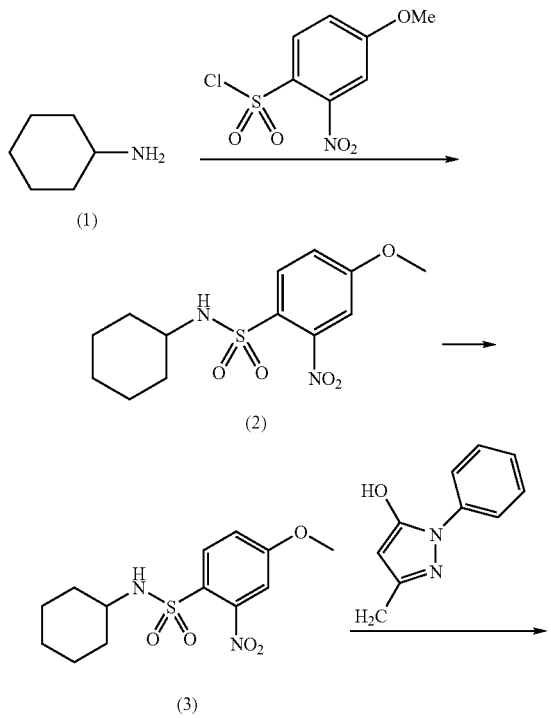

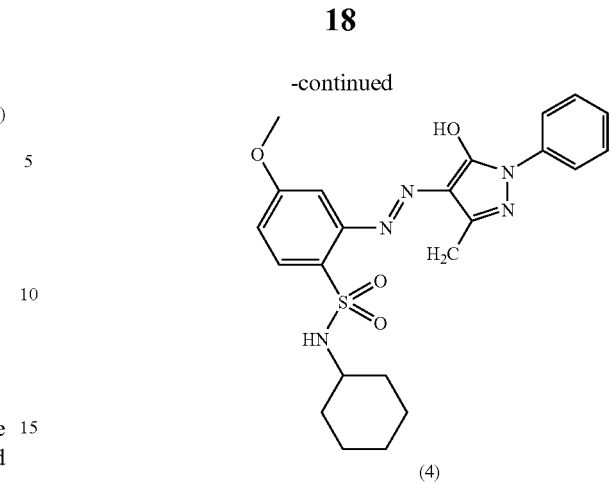

(4)

11.28 g of cyclohexylamine (above compound (1)), 27 g of 4-methoxy-2-nitrobenzenesulfonyl chloride, 54 ml of orthodichlorobenzene and 4.3 ml of distilled water were mixed, and the mixture was stirred at room temperature for one hour. After the stirring was finished, the temperature of the mixture was raised to 50° C. and then an aqueous solution containing 5.69 g of sodium carbonate was added to the mixture, which was then further stirred at 70° C. for one hour. Then, the reaction mixture was poured into water, extracted with ethyl acetate, and the ethyl acetate phase thereof was washed with an aqueous solution containing 4% of sulfuric acid. Thereafter, the ethyl acetate phase was dried and decolored by adding magnesium sulfate and activated carbon thereto, followed by filtration using celite. The ethyl acetate phase was then concentrated to obtain the aforementioned compound (2) (this compound (2) was directly used in the next reaction as it was).

Next, 35 g of reduced iron, 25 g of acetic acid and 75 g of water were mixed, and the mixture was stirred at 80° C. The compound (2) obtained above was gradually added to the mixture, which was then stirred at 80° C. for 2 hours. Then, 26 ml of ethanol was added to the mixture, which was then stirred under refluxing for 2.5 hours. The reaction mixture was cooled to room temperature, and 32.5 g of sodium carbonate was further added to the reaction mixture. Then, the mixture was subjected to celite filtration by adding 200 ml of ethyl acetate, celite and activated carbon. Then, the organic phase was subjected to steam distillation to obtain 24.78 g of the compound (3) (overall yield: 80%).

Then, 5.69 g of the compound (3), 0.09 g of tetraethylammonium chloride, 100 ml of acetic acid, 7.3 ml of 36% hydrochloric acid and 11 ml of distilled water were mixed and the mixture was cooled to 0° C. An aqueous solution of sodium nitrite ($NaNO_2$: 1.4 g, water: 10 g) was added dropwise to the mixture while the temperature of the mixture was kept at 5° C. or less. After the addition, the mixture was stirred for 3 hours while keeping the temperature of the mixture at 5 to 10° C. so as to obtain a diazo solution.

The diazo solution was added dropwise to a separately-prepared slurry liquid of 3-amino-1-phenyl-2-pyrazolin-5-one (3-amino-1-phenyl-2-pyrazoline-5-one: 3.71 g, water: 40 g, 36% hydrochloric acid: 2.14 g), at 0° C. over 30 minutes. Then, 38 ml of an aqueous 40% sodium acetate solution was added dropwise over one hour and then 50 ml of an aqueous solution containing 10% of sodium carbonate was added dropwise to the mixture, which was then stirred overnight. In succession, 100 ml of an aqueous solution containing 50% of NaOH was added dropwise to the reaction mixture, which was then heated to 65° C., stirred for one hour and then cooled to room temperature. The resulting mixture was subjected to filtration and the residue was washed with alkaline brine to obtain 6.80 g of the desired above compound (4) (the exemplified compound (1) described above) of the invention (yield: 75%).

The structure of the azo compound obtained above was confirmed by NMR to obtain the following result: $^1$H-NMR (300 MHz, solvent: dimethyl-$d_6$ sulfoxide, standard material: tetramethylsilane) δ7.95 ppm (2H, d), 7.80(2H, m), 7.62(1H, s), 7.43(2H, t), 7.15(1H, t), 6.85(1H, d), 6.65(2H, s), 3.95(3H, s), 3.10(1H, m), 1.60(4H, m), 1.43 (1H, m), 1.25-0.85(6H, m).

In addition, the azo compound was dissolved in methanol to prepare a solution having a concentration of about $1.0 \times 10^{-5}$ mol/l, and using a light spectrum anylizer (Trade name: UV-2500PC; manufactured by Shimadzu Corporation) the maximum absorption wavelength ($\lambda_{max}$) and the molar absorption coefficient($\epsilon$), and the half-value width of the waveform, was measured to obtain the following result: $\lambda_{max}$ in methanol=384 nm, $\epsilon$=25800 [l·mol$^{-1}$ cm$^{-1}$] and half-value width: 70.5 nm.

EXAMPLE 2

An azo compound (the exemplified compound (2)) according to the invention was obtained by carrying out the same synthesis process as that in Example 1 except that 2-nitrobenzenesulfonyl chloride was used in place of 4-methoxy-2-nitrobenzenesulfonyl chloride. The measurements of the structure by using NMR, $\lambda_{max}$, $\epsilon$ and half-value width were conducted in the same manner as in Example 1.

$^1$H-NMR (300 MHz, solvent: dimethyl-$d_6$ sulfoxide, standard material: tetramethylsilane) δ8.20 ppm (1H, d), 7.95 (3H, m), 7.82(1 H, d), 7.67(1 H, t), 7.41(2H, t), 7.30(1H, t), 7.15(1H, t), 6.60(2H, br.s), 3.15(1H, m), 1.70-0.90(10H, m). $\lambda_{max}$ in methanol=382.5 nm, $\epsilon$=24200 [l·mol$^{-1}$ cm$^{-1}$] and half-value width: 70 nm.

EXAMPLE 3

An azo compound (the exemplified compound (5)) according to the invention was obtained by carrying out the same synthesis process as that in Example 1 except that N-ethylaniline was used in place of cyclohexylamine, which is the compound (1), and 2-nitrobenzenesulfonyl chloride was used in place of 4-methoxy-2-nitrobenzenesulfonyl chloride. The measurements of the structure by using NMR, $\lambda_{max}$, $\epsilon$ and half-value width were conducted in the same manner as in Example 1.

$^1$H-NMR (300 MHz, solvent: dimethyl-$d_6$ sulfoxide, standard material: tetramethylsilane) δ8.19 ppm (1H, d), 7.88 (2H, d), 7.75(1H, t), 7.60(1H, d), 7.43(2H, t), 7.35-7.00(7H, m), 6.48(2H, br.s), 3.70(2H, q), 0.95(3H, t). $\lambda_{max}$ in methanol=385 nm.

What is claimed is:

1. An azo compound represented by the following Formula (I):

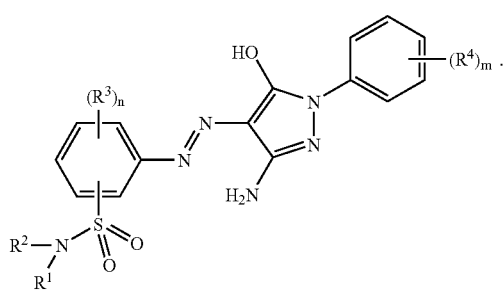

Formula (I)

wherein: $R^1$ and $R^2$ respectively independently represent a hydrogen atom, an alkyl group having 1 to 21 carbon atoms, an alkenyl group having 2 to 21 carbon atoms, an aryl group having 6 to 21 carbon atoms or an aralkyl group having 7 to 21 carbon atoms, or $R^1$ and $R^2$ may form a hetero ring in combination with a nitrogen atom combined therewith; $R^3$ represents a halogen atom, a trihalomethyl group, an alkoxy group having 1 to 21 carbon atoms, a nitro group or an unsubstituted or substituted amino group; $R^4$ represents a halogen atom or a —$SO_3M$ group, where M represents a cation of a metal atom or a cation made of a nitrogen-containing compound; m denotes an integer from 0 to 5; and n denotes an integer from 0 to 4.

2. The azo compound of claim 1, wherein $R^1$ or $R^2$ in Formula (I) respectively represents an alkyl group having 1 to 10 carbon atoms.

3. The azo compound of claim 1, wherein $R^1$ or $R^2$ in Formula (I) respectively represents an aryl group having 6 to 10 carbon atoms.

4. The azo compound of claim 1, wherein $R^1$ or $R^2$ in Formula (I) respectively represents an aralkyl group having 7 to 10 carbon atoms.

5. The azo compound of claim 1, wherein the sum of the formula weights of $R^1$ and $R^2$ in the Formula (I) is 500 or less.

6. The azo compound of claim 1, wherein $R^3$ in Formula (I) represents a chlorine atom, a trifluoromethyl group, an alkoxy group having 1 to 7 carbon atoms, a nitro group, a substituted amino group or an unsubstituted amino group.

7. The azo compound of claim 1, wherein n in Formula (I) denotes an integer from 0 to 1.

8. The azo compound of claim 1, wherein $R^4$ in Formula (I) represent a chlorine atom or a —$SO_3M$ group.

9. The azo compound of claim 1, wherein M in Formula (I) represents a cation of Na, K, Mg, Ca, Ba, Zn, Al, Cu or Fe or a cation of a nitrogen-containing compound.

10. The azo compound of claim 1, wherein m in Formula (I) denotes an integer from 0 to 3.

11. The azo compound of 1, wherein the azo compound represented by Formula (I) has a structure represented by the following Formulae (II), (III) or (IV):

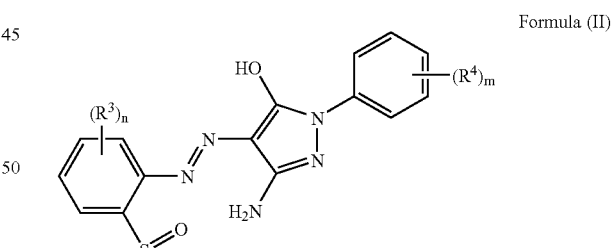

Formula (II)

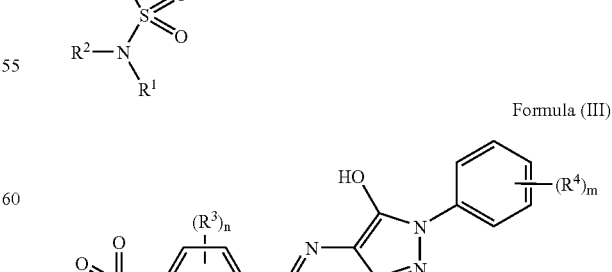

Formula (III)

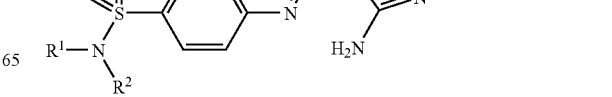

-continued
Formula (IV)
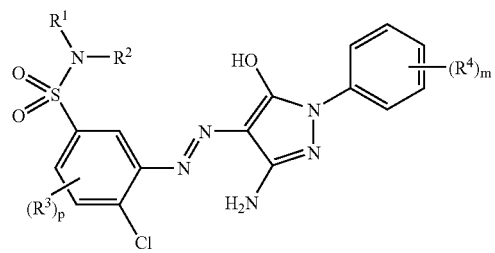
wherein: the definition of $R^1$, $R^2$, $R^3$, $R^4$ and m are the same as $R^1$, $R^2$, $R^3$, $R^4$ and m in Formula (I) respectively; the definition of n in Formulae (II) and (III) are the same as n in the Formula (I); and p in Formula (IV) denotes an integer from 0 to 3.
* * * * *